United States Patent Office 3,632,851
Patented Jan. 4, 1972

3,632,851
4-CARBOXY-2-PIPERIDONE
George J. Schmitt, Madison, and Karl P. Klein and
Herbert K. Reimschuessel, Morristown, N.J., assignors
to Allied Chemical Corporation, New York, N.Y.
No Drawing. Filed Feb. 26, 1969, Ser. No. 802,630
Int. Cl. C07d 29/24
U.S. Cl. 260—293.88                            1 Claim

ABSTRACT OF THE DISCLOSURE

Dialkyl esters of itaconic acid react readily with hydrogen cyanide to form dialkyl cyanomethyl succinates which, upon catalytic hydrogenation, form monoalkyl esters of 4-carboxy-2-piperidone. Saponification of the ester affords the free acid, 4-carboxy-2-piperidone, which readily undergoes polymerization to a novel and highly useful polymer.

BACKGROUND OF THE INVENTION

This invention relates to a novel process for the preparation of 4-carboxy-2-piperidone and alkyl esters thereof.

More particularly, it relates to a rapid, simple and efficient process for preparing such compounds from readily available starting materials.

Analogs of 4-carboxy-2-piperidone, its esters and other derivatives are known to be useful intermediates in the synthesis of pharmaceutically and biologically active compounds. We have found that 4-carboxy-2-piperidine readily undergoes polymerization to afford novel and valuable polymers.

DESCRIPTION OF THE PRIOR ART 4-methoxy carbonyl-2-piperidone is a known compound. Its preparation is described in Chem. and Pharm. Bulletin (Tokyo) 8, 1106 (1960). The synthetic route reported therein is extremely complex, gave poor yields, and utilized a very expensive starting material.

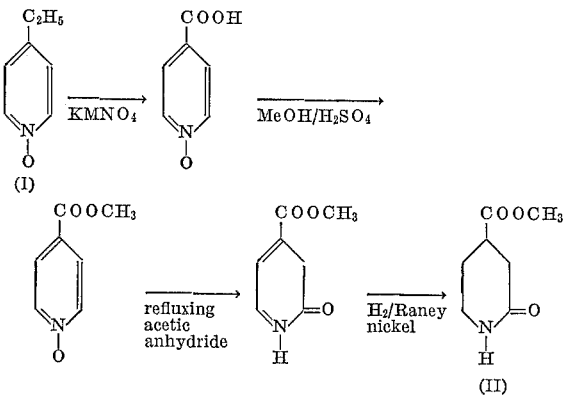

The source of compound (I), the starting material for their synthesis, was not explicitly stated, but compound (I) has in the past been obtained by oxidation of 4-ethyl pyridine with peracetic acid. 4-ethyl pyridine is itself a rather rare compound. Preparation thereof is reported in Rec. Trav. Chim., 60, 119 (1951).

It is thus apparent that the prior art had no commercially practicable process for producing 4-carboxy-2-piperidone or its esters.

SUMMARY OF THE INVENTION

It is an object of this invention to provide a new and improved process for the preparation of 4-carboxy-2-piperidone and esters thereof.

It is a further object to provide a simple and efficient process for the production of such compounds from readily available starting materials.

Further objects and advantages will become apparent from the description of the invention which follows in greater detail.

It has now been found in accordance with the instant invention that 4-alkoxy carbonyl-2-piperidones can be prepared in only two steps, both of which afford high yields, from dialkyl esters of itaconic acid.

The two-step reaction we have discovered can be represented as follows:

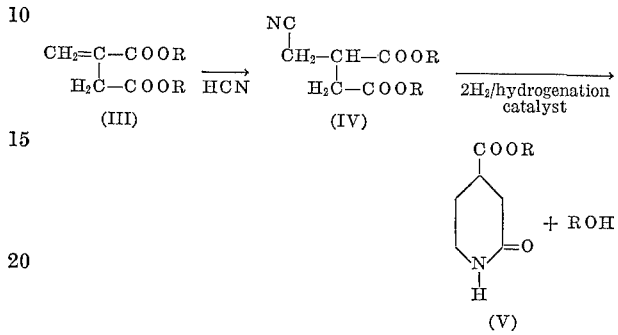

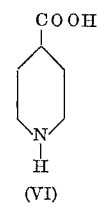

wherein R is compounds (III), (IV) and (V) represents an alkyl group of 1–10 carbon atoms. The free acid, 4-carboxy-2-piperidone (VI)

can be prepared from the ester (V) by conventional ester saponification with base followed by acidification. This compound is unknown to the prior art.

While we do not wish to be bound by any mechanistic interpretation, it is believed that the transformation of compound (IV) into compound (V) takes place by approximately the following route:

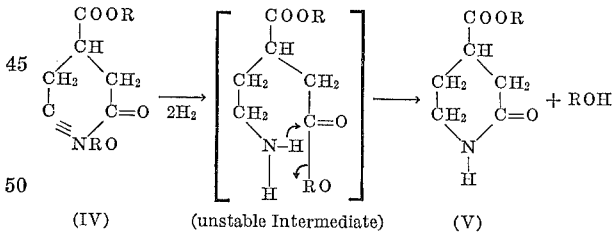

That is, a catalytic cyclohydrogenation occurs wherein compound (IV) is reduced and cyclized to form compound (V). As heretofore indicated, R connotes a $C_1$–$C_{10}$ alkyl group and ROH is, therefore, a $C_1$–$C_{10}$ alcohol. The actual R group present on the itaconic ester is not of particular significance in that it has little effect on the course of the transformation of compound (IV) into compound (V). However, in terms of availability and ease of separation of ROH from compound (V), R is preferably $C_1$–$C_3$.

Dialkyl esters of itaconic acid (compound [III]) are commercially available or they may be prepared by esterification of itaconic acid with 2 mols of alcohol, ROH, using conventional esterification methods.

The reaction of compound (III) with hydrogen cyanide is most safely and conveniently carried out by dissolving compound (III) in a water-miscible solvent such as methanol, ethanol, isopropyl alcohol or tetrahydrofuran, to which is then added an aqueous solution of an alkali metal cyanide. Thereafter, an acid such as hydrochloric is added to transform the metal cyanide into hydrogen cyanide, e.g., $$KCN + HCL \rightarrow HCN + KCl$$

Alternatively, the diester of itaconic acid can be dissolved in any suitable solvent such as methanol, ethanol, isopropyl alcohol or tetrahydrofuran and HCN in gaseous or liquid form, which has been generated separately, passed into the ester solution. Reaction between the itaconic ester (III) and HCN is essentially quantitative and can suitably be effectuated at a temperature ranging from about —40° C. up to about 50° C., preferably from a convenience standpoint, the reaction is effectuated at 0° C. to 35° C. The reaction generally requires from 1–5 days to go to completion. The reaction of olefinic double bonds with HCN is a generally known reaction. The cyanolation of certain itaconic acid esters has also been reported [E. Hope, Proc. Chem. Soc., 28, 192, (1912)].

The reduction of compound (IV) cannot be suitably carried out directly on the cyanolation reaction mixture because of the many other compounds present. Compound (V) should be isolated from the cyanolation reaction mixture and then reduced. This isolation can be effected, for example, by fractional distillation or by contacting the cyanolation reaction mixture with an aprotic, water-immiscible solvent such as ether, petroleum ether, ligroin, hexane, benzene, and the like, which extracts compound (IV) from the cyanolation reaction mixture. If the latter method is used, after drying and evaporation of the extraction solvent, compound (IV) remains behind as a residue in the form of a viscous oil. It can further be purified by distillation at reduced pressure if desired.

Reductive cyclization of compound (IV) to form compound (V) is effected by catalytic hydrogenation. A suitable hydrogenation pressure can range from 50 p.s.i. to 1,000 p.s.i. Lower pressures take unduly long and higher pressures are unnecessary and require complicated equipment. A suitable hydrogenation temperature is from about 50° to about 150° C. Below 50° C. the hydrogenation will take place but it requires an unduly prolonged amount of time. Most preferably, the hydrogenation temperature is 80°–120° C. Suitable hydrogenation catalysts include Raney nickel, platinum oxide, palladium, platinum, or ruthenium on charcoal, and the like.

The hydrogenation procedure for compound (IV) ordinarily entails dissolution of compound (IV) in a water-miscible solvent such as ethanol, methanol, tetrahydrofuran, glyme, or isopropanol. Hydrogenation catalyst is then added to the solution in a pressure vessel which is then purged of oxygen, and hydrogen is admitted. Reduction is ordinarily carried out by heating the vessel with concomitant agitation until hydrogen uptake has ceased. Hydrogenation is ordinarily complete in about 2 to 10 hours.

Compound (V) is recovered from the hydrogenation mixture by filtering off the catalyst and then evaporating the solvent. Catalytic hydrogenation of the cyano group to the corresponding amino group is well known in the chemical art and the instant invention is not be construed as being limited to the specific hydrogenation conditions and catalysts described above since other cyano group hydrogenation procedures are known or readily ascertainable by the skilled art worker.

Compound (V) is a solid which, if desired, can be further purified by recrystallization. Such recrystallization is preferably carried out from a solvent/nonsolvent mixture. Suitable solvents include methanol, glyme, methylene chloride, chloroform, carbon tetrachloride, acetone, and the like. Suitable nonsolvents include hydrocarbons such as petroleum ether, ligroin, hexane, benzene, and the like.

Compound (VI) is prepared from compound (V) by saponification and acidification of the latter using conventional ester saponification procedures, e.g., heating compound (V) with alcoholic or aqueous caustic followed by acidification with sulfuric or hydrochloric acid or by heating compound (V) with alcoholic caustic, evaporating off the alcohol, dissolution of the nonvolatile residue [the salt of compound (VI)] in water and acidifying it which causes compound (VI) to precipitate as it is formed. This reaction can be represented as follows:

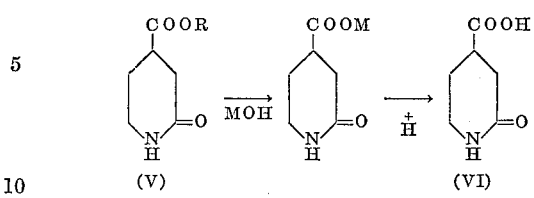

wherein M connotes potassium, sodium, lithium, calcium, magnesium, or other alkali or alkaline earth metal. Compound (VI) is a solid and it can be further purified by recrystallization from a solvent such as dioxane, water, ethanol, tetrahydrofuran, or mixtures thereof, if desired.

The polymer prepared from compound (VI) is believed to comprise recurring units of the following structure:

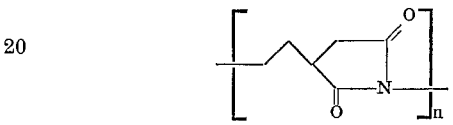

that is, a poly[2,5-dioxo-1,3-pyrollidindiyldimethylene].

The polymerization is effected by heating compound (VI) under an oxygen-free atmosphere such as nitrogen or helium at a temperature of at least 150° C. If desired, a catalytic amount of water can be added to initiate polymerization. Polymerization begins within one hour although a longer heating period is generally preferable in that it affords higher molecular weight polymer.

The polymer is an amorphous solid which may be formed by extrusion into clear films or fibers having excellent thermal stability and a high glass-transition temperature.

Such polymers and the process for their preparation are claimed in our copending, commonly assigned, U.S. patent application Ser. No. 802,673 entitled "Polymer of 4-Carboxy-2-Piperidone" filed on instant date herewith.

The invention can be more fully understood by reference to the following examples. All parts are parts by weight unless otherwise expressly noted.

EXAMPLE 1

Dimethyl cyanomethyl succinate

To a stirred solution of 79.0 grams (0.5 mol) of distilled dimethyl itaconate in 400 ml. of methanol cooled to 2° C. was added dropwise 65.1 grams (1 mol) of potassium cyanide in 400 ml. of water. After ½ hour, 65 ml. (0.75 mol) of cold concentrated hydrochloric acid was added. The reaction mixture was stirred at room temperature for 72 hours and then extracted with three portions of ether. The ethereal extracts were combined, dried over MgSO$_4$, filtered, and solvent evaporated. The resulting oil was distilled at reduced pressure to afford 71.4 grams (77%) of dimethyl cyanomethyl succinate, B.P. 113–117° C. at 0.8 mm. Hg.

Infrared analysis (neat) showed strong absorption bands at 2260$^{cm-1}$ (C$\equiv$N) and 1745$^{cm-1}$ (C=O).

*Elemental analysis.*—Calculated for C$_8$H$_{11}$NO$_4$ (percent): Theory: C, 51.88; H, 5.99; N, 7.57. Found: C, 51.58; H, 5.76; N, 7.76.

EXAMPLE 2

4-methoxycarbonyl-2-piperidone

A solution of dimethyl cyanomethyl succinate (46.3 grams) (0.25 mol) in 250-cc. methanol was hydrogenated at 400 p.s.i. and 100° C. for 5 hours using a Raney nickel catalyst (4 grams). Following hydrogenation, the solution was filtered to remove the catalyst and the methanol evaporated at reduced pressure. The resulting solid residue was recrystallized from petroleum ether/methylene chloride to give 33.8 grams (86%) of 4-methoxycarbonyl-2-piperidone; melting point 126.5°–127° C. Infrared analysis (KBr pellet) showed strong absorption bands at 1740$^{cm-1}$ (ester C=O), 1665$^{cm-1}$ (lactam C=O).

*Elemental analysis.*—Calculated for $C_7H_{11}NO_3$ (percent): Theory: C, 53.49; H, 7.06; N, 8.91. Found: C, 53.33; H, 7.14; N, 8.92.

EXAMPLE 3

Independent synthesis of 4-methoxycarbonyl-2-piperidone

This was accomplished by using essentially the method of Takahashi and Kariyone, Chem. and Pharm. Bull. (Tokyo), 8, 1106 (1960). A mixed melting point of this sample and that prepared in Example 2 was undepressed, and the infrared spectra of the two samples were superimposable.

EXAMPLE 4

4-carboxy-2-piperidone

To a stirred solution of 12.3 grams (0.22 mol) of potassium hydroxide in 150 ml. of methanol was added 31.4 grams (0.2 mol) of 4-methoxycarbonyl-2-piperidone in 150 ml. of methanol. The solution was refluxed for 6 hours and allowed to stir at room temperature for 16 hours. The solvent was then removed at reduced pressure. The resulting solid was dissolved in 50 ml. water, cooled to about 0° C., and acidified with concentrated hydrochloric acid. Three recrystallizations of the precipitate from ethanol-water yielded 25.5 grams (89%) of 4-carboxy-2-piperidone; M.P. 174.5°–175.5° C. Infrared analysis (KBr pellet) showed strong absorption bands at 1695$^{cm-1}$ (acid C=O) and 1635$^{cm-1}$ (lactam C=O).

*Elemental analysis.*—Calculated for $C_6H_9NO_3$ (percent): Theory: C, 50.34; H, 6.34; N, 9.79. Found: C, 50.36; H, 6.36; N, 9.60.

EXAMPLE 5

4-ethoxycarbonyl-2-piperidone

Diethyl cyanomethyl succinate was prepared from diethyl itaconate in 75% yield using the procedure of Example 1. This compound had the following properties: boiling point, 106–109° C. at 0.3 mm. Hg. Infrared analysis (neat) showed strong absorption bands at 2265$^{cm-1}$ (C≡N) and 1740$^{cm-1}$ (C=O).

*Elemental analysis.*—Calculated for $C_{10}H_{15}NO_4$ (percent): Theory: C, 56.32; H, 7.09; N, 6.57. Found: C, 56.35; H, 7.02; N, 6.53.

This compound was hydrogenated using the procedure of Example 2 to afford 90% yield of 4-ethoxycarbonyl-2-piperidone, melting point 108°–109° C. Infrared analysis (KBr pellet) showed strong absorption bands at 1740$^{cm-1}$ (ester C=O), 1660$^{cm-1}$ (lactam C=O).

*Elemental analysis.*—Calculated for $C_8H_{13}NO_3$ (percent): Theory: C, 56.12; H, 7.65; N, 8.18. Found: C, 56.15; H, 7.61; N, 8.07.

Saponification afforded 4-carboxy piperidone, melting point 175° C. Infrared and elemental analyses were identical with the compounds prepared in Example 3 and Example 4.

EXAMPLE 6

A large quantity of dimethyl cyanomethyl succinate was prepared using the procedure of Example 1. Hydrogenation of aliquots thereof indicates the following hydrogenation catalysts are also suitable for effecting the reductive cyclization to 4-methoxycarbonyl-2-piperidone.

| Hydrogenation catalyst | Temp. (° C) | Hydrogen pressure (p.s.i.) |
| --- | --- | --- |
| 5% palladium on carbon | 50 | 500 |
|  | 100 | 500 |
|  | 150 | 500 |
| Platinum oxide | 100 | 200 |
|  | 110 | 300 |
|  | 120 | 400 |
| Raney nickel | 80 | 150 |
|  | 100 | 250 |
|  | 120 | 350 |
| 5% platinum on carbon | 100 | 500 |
| 5% ruthenium on carbon | 100 | 500 |

In all cases, the reduction is complete at the end of 10 hours. In most instances, hydrogen uptake, essentially ceases after 3 hours.

Various modifications will be apparent to one skilled in the art, and it is not intended that this invention be limited to the details in the specific examples presented by way of illustration. Accordingly, the scope of the invention is limited only by the appended claim.

We claim:
1. 4-carboxy-2-piperidone.

References Cited

UNITED STATES PATENTS 2,585,210 2/1952 Albertson et al. _____ 260—294
2,992,268 7/1961 Barley et al. _____ 260—465.4

OTHER REFERENCES

Badger et al., J. Chem. Soc. 1949, 1141–4.

Paden et al., J. Am. Chem. Soc. 58, 2487 (1936).

Takahashi et al., Chem. & Pharm. Bull. (Tokyo) 8, 1106–9 (1960).

HENRY R. JILES, Primary Examiner

G. T. TODD, Assistant Examiner

U.S. Cl. X.R.

260—78 P, 293.52, 295 R